UNITED STATES PATENT OFFICE.

CHARLES F. LAWTON, ALBERT L. LAWTON, AND ARTHUR W. LAWTON, OF NEW YORK, N. Y.

CEMENT.

SPECIFICATION forming part of Letters Patent No. 637,211, dated November 14, 1899.

Application filed April 24, 1899. Serial No. 714,331. (No specimens.)

*To all whom it may concern:*

Be it known that we, CHARLES F. LAWTON, ALBERT L. LAWTON, and ARTHUR W. LAWTON, citizens of the United States, residing at New York, in the borough of Brooklyn and State of New York, have invented certain new and useful Improvements in Cement to Fasten Backs to Tiles; and we do hereby declare the following to be a full, clear, and exact description of the invention, such as will enable others skilled in the art to which it appertains to make and use the same.

This invention relates to a cement primarily designed to fasten irregular particles to the backs of tiles for the purpose of forming a roughened bonding-surface or retaining-points on the back of the tiles, although, of course, it may be used for other purposes where a binding-cement is useful.

The object of our invention is to prepare a cement in solution by means of which backs may be firmly cemented to tiles.

With this object in view the invention consists in a cement adapted to be applied to tiles, which cement will become hard on drying and will slowly turn insoluble by exposure after a considerable time or will quickly become insoluble after drying by heating to a temperature below that of fusion.

This invention should clearly be distinguished from other inventions in which the substance forming the bond between the tile and its backing is in the nature of or in effect a flux—that is to say, a substance which has to be fused in order to make it effective. The cement covered by the present invention never has to be melted, but by simply drying it becomes hard and retentive, and when this drying operation is continued it becomes insoluble, and by drying and subsequently heating, even far below the point of fusion, it at once becomes insoluble.

A marked advantage of doing away with the necessity of fusion is that when a substance is to be fused in order to make it act as a suitable binder between the tile and its backing the melting of the substance used as a binder causes said substance to creep up in the form of smooth-surfaced cones around the particles, thus masking them and smoothing over their irregularities and angles and so depriving the tile of the advantage of a roughened surface.

The basis of our cement is an aqueous solution of an alkaline silicate or so-called "water-glass;" but water-glass alone, however, will not properly solidify upon drying and exposure for a time nor upon the drying and heating to a point below fusion. To render the water-glass thus capable of becoming hard and insoluble on drying and exposure or on drying and heating, as described, we have discovered that it is necessary to add to it certain substances which will give the proper degree of insolubility to the cement. To give the proper color, metallic oxids are sometimes added, preferably incorporated with insoluble vitreous matter, such as ordinary insoluble glass, and to this end any insoluble glass, such as silicate of soda and lime, is fused with said metallic oxids. Enough of these oxids are used to sufficiently color the glass and render it opaque. The impregnated glass thus produced is then ground to a fine powder and mixed with the alkaline-silicate solution. A cement is thus produced which on subsequent drying and, if desired, upon heating will become a hard and insoluble substance. The purpose of making the cement opaque, with or without color, is that any surface to which it is applied may not show through it.

The following is a specific illustration of a cement made in accordance with our invention: To fifty parts, by weight, of an alkaline-silicate solution of the consistency of syrup is added fifty parts, by weight, of finely-ground glass impregnated with metallic oxid, and the whole is thoroughly ground or mixed by any suitable means.

It will be noted that any desired color may be imparted to the cement by the selection of a particular metallic oxid or oxids and that the color as to tints and shades may be modified or that the effect may be made of variegated color by the employment of different oxids. If lighter shades or more opaque glass be desired, the amount of the ground colored glass may be diminished and its place supplied with powdered marble or with finely-ground silica of a kind known as "floated flint flour." If a pure white color is desired, a colorless insoluble glass is fused with oxid of tin or with tribasic calcium phosphate or with cryolite, any one of which produces a white opaque effect when fused with glass. This white glass is, after fusion and cooling, ground to a fine powder, and the powder is mixed with the alkaline silicate, together with carbonate of lime and powdered silica, and the whole finally ground together.

The colors imparted to the cement by the colored-glass powders, as described, may be intensified or modified to produce different shades and tints by employing some of the powdered carbonate of lime or silica, mixed with vermilion (sulfid of mercury) or india-red (silicate of iron) or finely-ground peroxid of iron or ultramarine, either green or blue. When ultramarine is used, it should first be ground in enough water to simply moisten it, and generally the color, as to tints and shades, may be modified or the effect may be made of variegated color by the addition of a suitable color or colors not previously fused with glass.

Oxid of zinc can be used to whiten the cement, but unless used and applied and dried very soon after mixing it spoils the cement by rendering it powdery and of little strength.

By placing this cement on a tile and then allowing it to dry and exposing the tile for some time to the action of the air at the ordinary temperature or by drying and subjecting to an artificial heat below that of the point of fusion of the cement said cement will become hard and insoluble and form an inseparable covering, back, or face to the tile, and where material for retaining-points is applied to this cement, either before it becomes hard or afterward by additional cement, these cements form an inseparable bond between the tile and the material used for retaining-points or between the cement on the tile which has been allowed to harden and subsequently-superimposed material for retaining-points. Of course any sort of a tile may be used with said cement. After the cement is made up and finely ground to a consistency of moderately-thin paste it is spread evenly and in one or more coats on the surface or surfaces to be colored or to be provided with retaining-points. The coating or layer of cement is to be from one-fortieth of an inch to one-tenth of an inch, more or less, in thickness, and if the cement is applied to a tile the surface of cement, while still soft and plastic, is sprinkled with sharp sand or powdered glass or powdered rock and the tile laid aside for the cement to dry and harden, after which all loose and non-adherent material is shaken off and the tile placed in an oven and very gradually heated up to a final temperature of about 360° Fahrenheit. The fire is then shut off, and, with the oven still kept closed, the whole is allowed to slowly cool down to the temperature of the air. In the beginning of this heating operation the heat is kept down, so that at the end of the first two hours the temperature of the oven is not above 200° Fahrenheit, and from this point the temperature of the oven is slowly raised during a period of about three hours to 360° Fahrenheit and is held at this heat for about one hour, at the expiration of which time the fire is shut off and the oven and its contents allowed to cool slowly.

Having thus described our invention, what we claim as new, and desire to secure by Letters Patent of the United States, is—

1. A cement composed of a solution of an alkaline silicate and an insoluble glass charged with a metallic oxid or oxids in a powdered condition, whereby said cement will be rendered colored or opaque, and will be rendered insoluble on drying and exposure or on drying and heating to a temperature below that of fusion, substantially as described.

2. A cement composed of a solution of fifty parts of an alkaline silicate, by weight, and fifty parts, by weight, of an insoluble glass charged with a metallic oxid or oxids in a powdered condition, whereby said cement will be rendered colored or opaque, and will be rendered insoluble on drying and exposure or on drying and heating to a temperature below that of fusion, substantially as described.

In testimony whereof we affix our signatures in presence of two witnesses.

CHARLES F. LAWTON.
ALBERT L. LAWTON.
ARTHUR W. LAWTON.

Witnesses:
M. H. BRIGGS,
JAMES A. BOLTON.

Thompson,610,776,Sept.13,1898,

Lawton,623,919,Apr.25,1899,

Soluble Glass, by Feutchtwanger, 3rd Edition, New York,1875,p.19, lines 23 and 24, German patent 3241,p. 155,last five lines.